United States Patent
Murase et al.

(10) Patent No.: US 8,806,130 B2
(45) Date of Patent: Aug. 12, 2014

(54) MEMORY ACCESS DEVICE OUTPUTTING TRANSFER REQUEST

(75) Inventors: Shigeyasu Murase, Yokohama (JP); Ayuko Uchida, Yokohama (JP); Akio Kanzaki, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 558 days.

(21) Appl. No.: 12/752,924

(22) Filed: Apr. 1, 2010

(65) Prior Publication Data

US 2010/0257310 A1 Oct. 7, 2010

(30) Foreign Application Priority Data

Apr. 2, 2009 (JP) ................................. 2009-090372

(51) Int. Cl.
*G06F 13/00* (2006.01)

(52) U.S. Cl.
USPC .................................. 711/118; 711/E12.069

(58) Field of Classification Search
USPC ........................................................ 711/118
See application file for complete search history.

(56) References Cited

U.S. PATENT DOCUMENTS

| | | | | |
|---|---|---|---|---|
| 5,493,664 | A * | 2/1996 | Doi ................................ | 711/100 |
| 6,311,237 | B1 * | 10/2001 | Suzuki et al. ................... | 710/52 |
| 6,317,427 | B1 * | 11/2001 | Augusta et al. ................ | 370/357 |
| 6,345,338 | B1 * | 2/2002 | Milillo et al. ................. | 711/137 |
| 6,615,302 | B1 * | 9/2003 | Birns ............................ | 710/121 |
| 6,725,457 | B1 * | 4/2004 | Priem et al. ................... | 718/104 |
| 6,732,223 | B1 * | 5/2004 | Johnson ......................... | 711/105 |
| 6,959,141 | B1 * | 10/2005 | Ichikawa et al. .............. | 386/353 |
| 6,965,725 | B1 * | 11/2005 | Ichikawa et al. .............. | 386/264 |
| 7,533,237 | B1 * | 5/2009 | Nordquist ...................... | 711/170 |
| 2002/0084922 | A1 * | 7/2002 | Yagi ................................ | 341/67 |
| 2002/0141456 | A1 * | 10/2002 | Wang et al. .................... | 370/539 |
| 2004/0039874 | A1 * | 2/2004 | Johnson ......................... | 711/105 |
| 2005/0078333 | A1 * | 4/2005 | Kobako et al. ................ | 358/1.15 |
| 2010/0005470 | A1 * | 1/2010 | Simon et al. ................... | 718/103 |

FOREIGN PATENT DOCUMENTS

| | | |
|---|---|---|
| JP | 05-265701 A | 10/1993 |
| JP | 11-161467 A | 6/1999 |
| JP | 2001-084129 A | 3/2001 |
| JP | 2007-310600 A | 11/2007 |

OTHER PUBLICATIONS

Japanese Office Action issued Sep. 25, 2012, in counterpart Japanese Application No. 2009-090372 (4pp including partial English translation).

* cited by examiner

*Primary Examiner* — Sesn D Rossiter
(74) *Attorney, Agent, or Firm* — Arent Fox LLP

(57) ABSTRACT

A memory access device includes a second memory coupled between a processor and a first memory; a memory controller configured to transfer a data from the first memory to the second memory based on a transfer request; a read controller configured to read the data from the second memory, output the data to the processor, and control a read pointer indicating an address reading the data from the second memory; and a write controller configured to output the transfer request to the memory controller, wherein the write controller computes an available capacity of the second memory based on the read pointer, a size of the second memory and a cumulative addition value obtained by adding cumulatively a size of the data which is requested from the processor, and outputs the transfer request based on the available capacity.

13 Claims, 7 Drawing Sheets

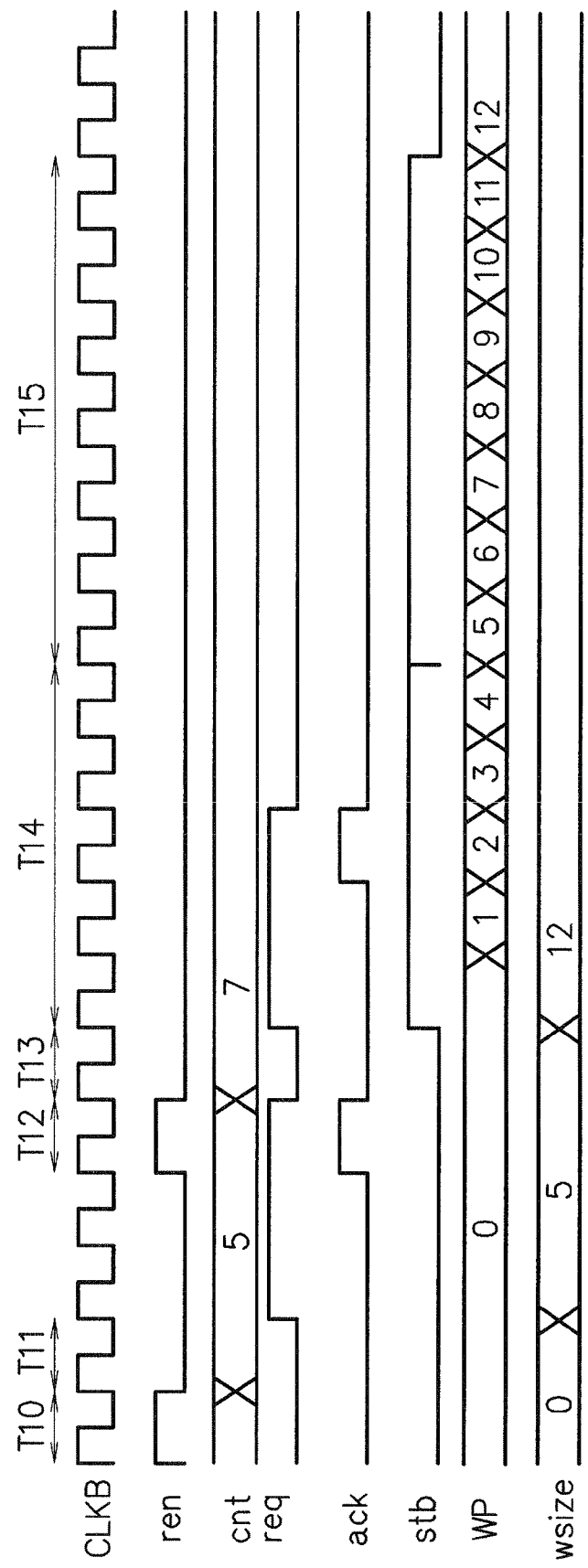
F I G. 4

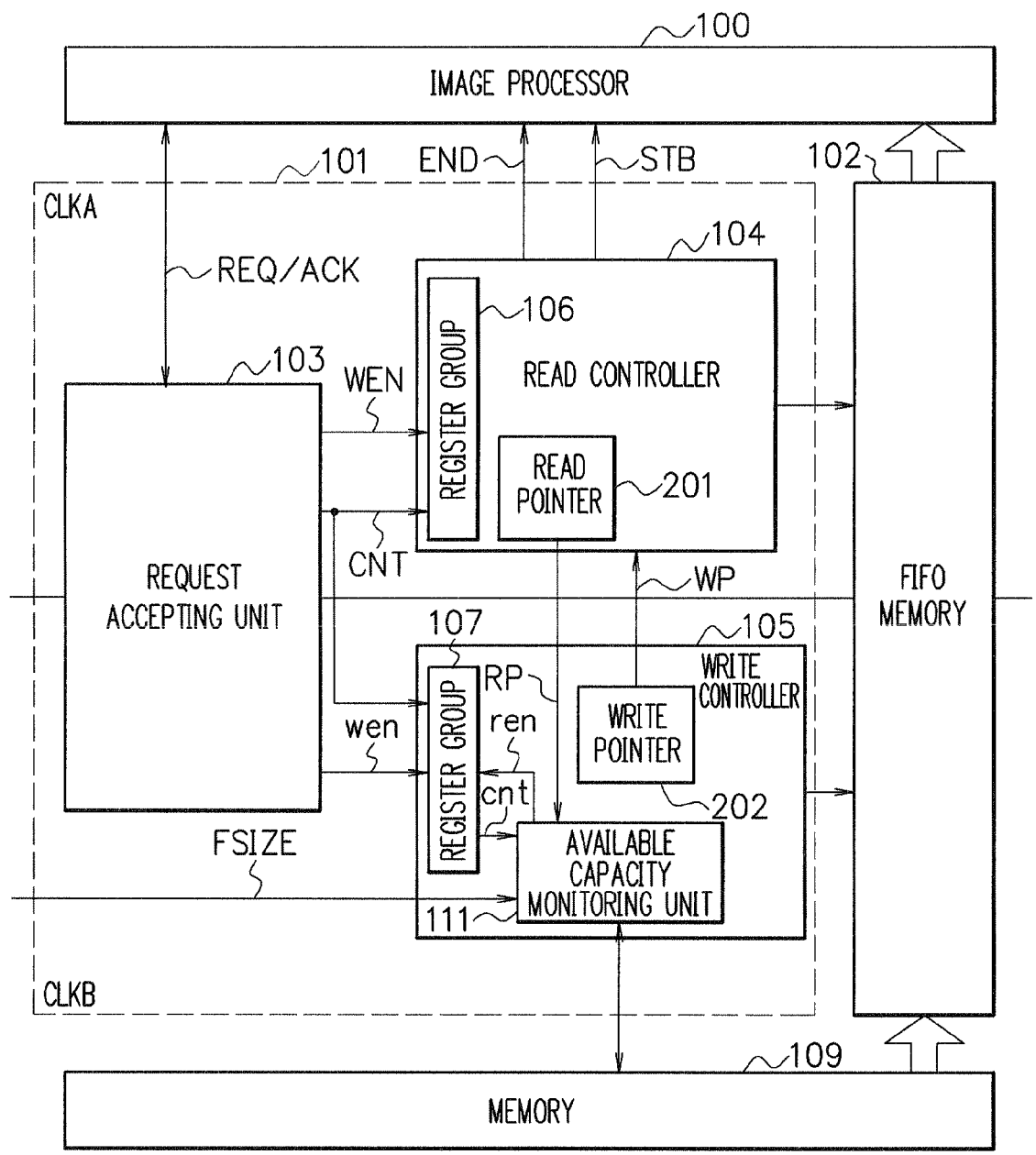
F I G. 7

MEMORY ACCESS DEVICE OUTPUTTING TRANSFER REQUEST

CROSS-REFERENCE TO RELATED APPLICATIONS

This application is based upon and claims the benefit of priority of the prior Japanese Patent Application No. 2009-090372, filed on Apr. 2, 2009, the entire contents of which are incorporated herein by reference.

FIELD

The present embodiments relate to a memory access device, a memory access system, and a processing method of the memory access device.

BACKGROUND

In Japanese Laid-open Patent Publication No. 2007-310600, there is disclosed a dual port type FIFO (first-in first-out) memory control circuit whose clocks differ on a writing side and a reading side. On the writing side, a control to write data into the FIFO memory in which a state of an available capacity of the FIFO memory is considered becomes a necessity. On the reading side, a control to read data in which reading does not overtake writing becomes a necessity.

In Japanese Laid-open Patent Publication No. 5-265701, there is disclosed a FIFO memory aiming at eliminating a necessity that an external device performing writing/reading performs an inspection of a full signal or an empty signal prior to writing/reading to thereby eliminate a waiting time occurring due to the inspection.

SUMMARY

According to one aspect of the present embodiments, there is provided a memory access device including: a counter counting a value holding a size of data corresponding to a processing region requested from a processor; a second memory coupled between the processor and a first memory where the data corresponding to the processing region is stored; a detector detecting a state of the second memory based on a read pointer and a value of the counter in the second memory; and a controller outputting a transfer request to transfer the data corresponding to the processing region from the first memory to the second memory based on a detection result of the detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a timing chart illustrating an example of a processing method of the memory access system in FIG. 3;

FIG. 7 is a block diagram illustrating a constitution example of a memory access system according to a second embodiment.

DESCRIPTION OF EMBODIMENTS

Figure 1:
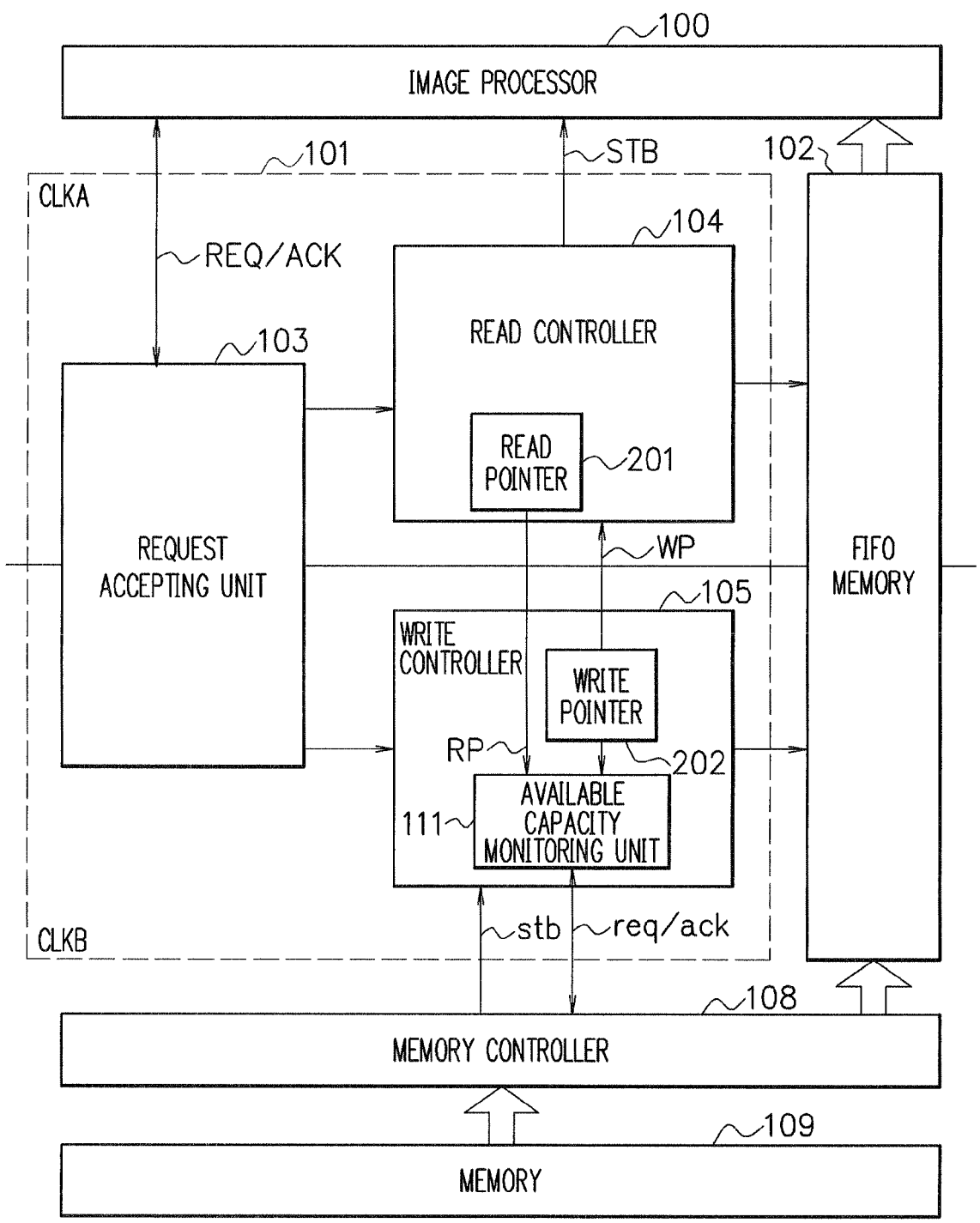
FIG. 1 is a block diagram illustrating a constitution example of a memory access system.

FIG. 1 is a block diagram illustrating a constitution example of a memory access system. A data transfer device 101 has a request accepting unit 103, a read controller 104, and a write controller 105. The read controller 104 has a read pointer storage unit 201 storing a read pointer RP therein. The write controller 105 has a write pointer storage unit 202 storing a write pointer WP therein and an available capacity monitoring unit 111 computing an available capacity of a FIFO memory 102.

A clock signal CLKA is a clock signal for an image processor 100. A clock signal CLKB is a clock signal for a memory controller 108 and an external main memory 109. The image processor 100 outputs a read request signal REQ of data to the data transfer device 101. Then, the write controller 105 in synchronization with the clock signal CLKB reads requested data in the external main memory 109 to write it into the FIFO memory 102. Thereafter, the read controller 104 in synchronization with the clock signal CLKA reads the requested data from the FIFO memory 102 to output it to the image processor 100.

The available capacity monitoring unit 111 computes an available capacity of the FIFO memory 102 based on the write pointer WP managed in the write controller 105 and the read pointer RP input by an asynchronous transfer from the read controller 104, and then issues a read request signal req to the memory controller 108, thereby making data transfer start. Thus, it may not be possible to compute an available capacity for a data transfer size of the following writing during an update period when the write pointer WP is counted up equivalently to a data transfer size. In other words, a determination that the following writing is started (the issuance of the read request signal req to the memory controller 108) is made after the preceding writing equivalent to a data transfer size is completed. This produces a result that the available capacity monitoring unit 111 waits until writing is completed even in a state where an available capacity for a data transfer size of the following writing is secured during a data transfer period, and therefore data transfer efficiency is reduced.

Figure 2:
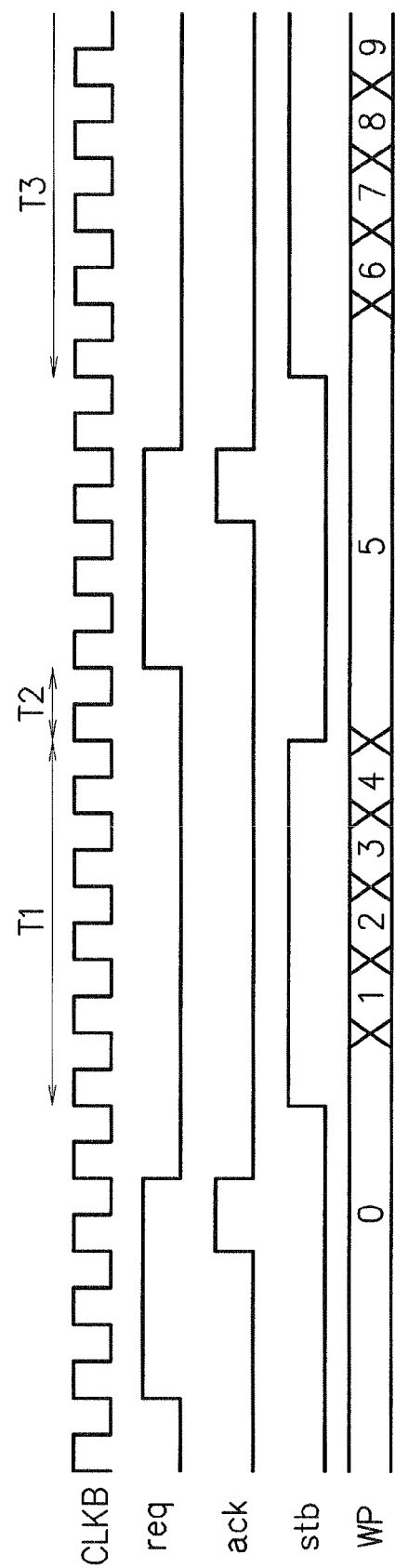
FIG. 2 is a timing chart illustrating an operation example of the memory access system in FIG. 1.

FIG. 2 is a timing chart illustrating an operation example of the memory access system in FIG. 1. The write controller 105 operates in synchronization with the clock signal CLKB. First, the write controller 105 outputs the read request signal req to the memory controller 108. The memory controller 108 outputs an acknowledge signal ack to the write controller 105 when data may be read from the external main memory 109 in response to the read request signal req. Thereafter, the memory controller 108 reads requested data from the external main memory 109 to output it to the FIFO memory 102 and outputs a data valid signal stb at a high level to the write controller 105. Then, the write controller 105 writes the data from the memory controller 108 into the FIFO memory 102 and increments the write pointer WP while the data valid signal stb is at a high level.

A period T1 is a period when data whose transfer size is five is transferred. In the period T1, it may not be possible to perform a computation of an available capacity for a transfer size of the following data. In a cycle of a period T2 when a data transfer of a certain transfer size is completed, the available capacity monitoring unit 111 performs a computation of an available capacity for a transfer size of the following data, and the write controller 105, if an available capacity may be secured, issues the read request signal req to the memory controller 108 to start the following data transfer.

Further, as for the update of the write pointer WP, by cyclically inquiring the write pointer WP from the read controller 104 to the write controller 105 at intervals of an inquiry set in a dedicated register, an inquiry is generated cyclically even in a state where the read requested signal REQ is not generated from the image processor 100 to the data transfer device 101.

First Embodiment

Figure 3:
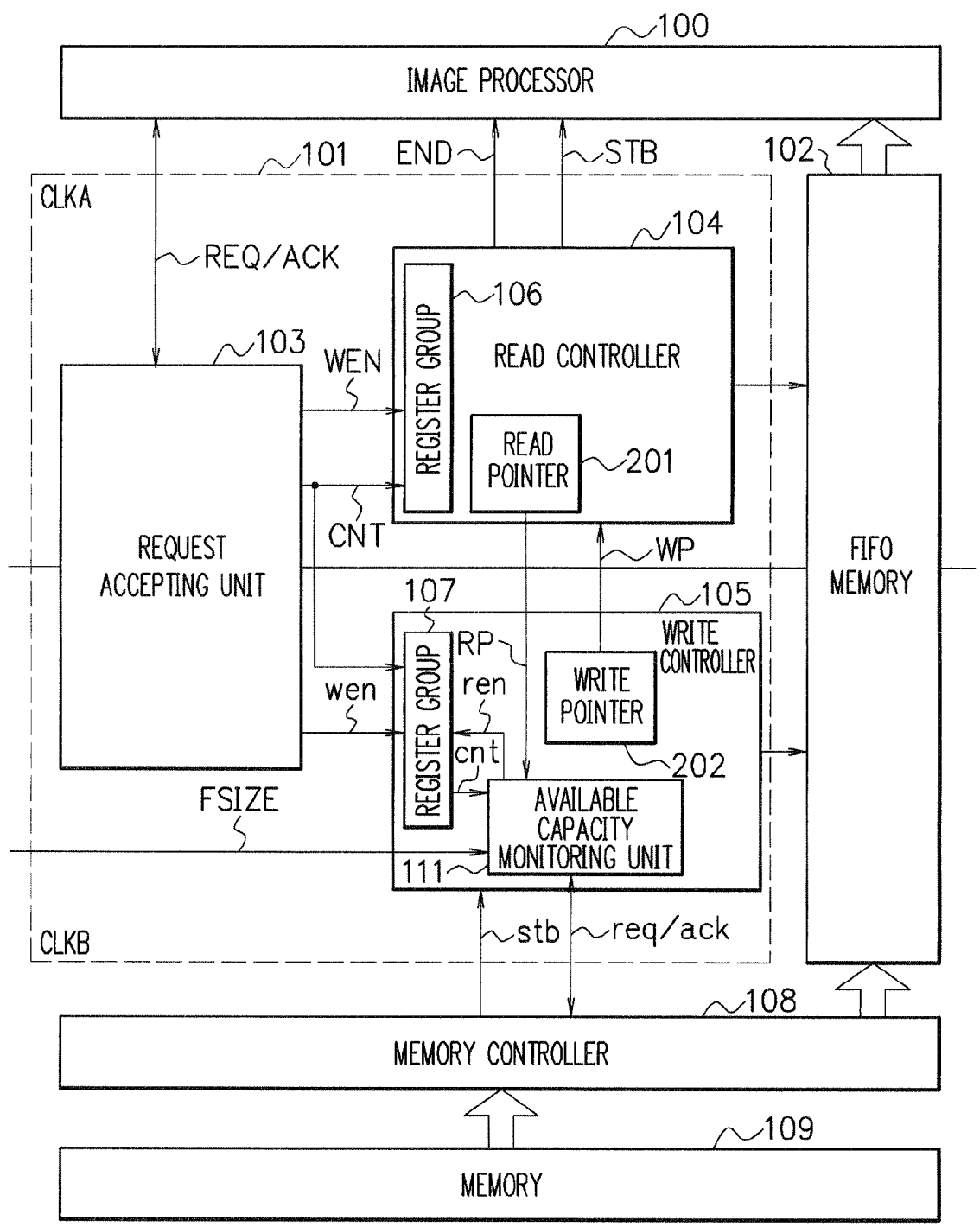
FIG. 3 is a block diagram illustrating a constitution example of a memory access system according to a first embodiment.

FIG. 3 is a block diagram illustrating a constitution example of a memory access system according to a first embodiment, and FIG. 4 is a timing chart illustrating an example of a processing method of the memory access system in FIG. 3.

The memory access system has an image processor 100, a data transfer device 101, a FIFO memory (second memory) 102, a memory controller 108, and an external main memory (first memory) 109. A memory access device has the data transfer device 101, the FIFO memory 102, and the memory controller 108. The data transfer device 101 has a request accepting unit 103, a read controller 104, and a write controller 105. The read controller 104 has a register group 106 and a read pointer storage unit 201 storing a read pointer RP therein. The write controller 105 has a register group 107, a write pointer storage unit 202 storing a write pointer WP therein, and an available capacity monitoring unit 111 computing an available capacity of the FIFO memory 102.

A clock signal CLKA is a clock signal for the image processor 100. A clock signal CLKB is a clock signal for the memory controller 108 and the external main memory 109. The read controller 104 operates in synchronization with the clock signal CLKA, and the write controller 105 operates in synchronization with the clock signal CLKB. The image processor 100 outputs a read request signal REQ to the data transfer device 101. Then, the write controller 105 in synchronization with the clock signal CLKB reads requested data in the external main memory 109 to write it into the FIFO memory 102. Thereafter, the read controller 104 in synchronization with the clock signal CLKA reads the requested data from the FIFO memory 102 to output it to the image processor 100. The FIFO memory 102 is a dual port type FIFO memory capable of writing and reading simultaneously. The clock signal CLKA of the read controller 104 and the clock signal CLKB of the write controller 105 differ in frequency. The write controller 105 performs data transfer between the external main memory 109 and the FIFO memory 102. The read controller 104 performs data transfer between the FIFO memory 102 and the image processor 100. A writing side operates by the clock signal CLKB and a reading side operates by the clock signal CLKA.

Hereinafter, the processing method of the memory access system is explained. The image processor 100 outputs the read request signal REQ including a start address and a size CNT of requested data corresponding to an image processing region to the request accepting unit 103 in order to read data stored in the external main memory 109. The request accepting unit 103 receives the read request signal REQ. The external main memory 109 is, for example, an SDRAM.

The request accepting unit 103 outputs a write enable signal WEN in synchronization with the clock signal CLKA to the register group 106 in the read controller 104 and writes the data size CNT into a certain register in the register group 106. Similarly, the request accepting unit 103 outputs a write enable signal wen in synchronization with the clock signal CLKB to the register group 107 in the write controller 105 and writes the data size CNT into a certain register in the register group 107. Thereafter, the request accepting unit 103 outputs an acknowledge signal ACK to the image processor 100.

In a period T10 in FIG. 4, the available capacity monitoring unit 111 outputs a read enable signal ren to the register group 107 and reads the data size CNT in the certain register in the register group 107 as a data size cnt. The data size cnt at this time is, for example, five words. One word is 64 bits. The external main memory 109 and the FIFO memory 102 may store one word data in each address.

The available capacity monitoring unit 111 has a transfer data size counter. The transfer data size counter is a counter cumulatively adding the data size cnt to a counter value wsize. As for the counter value wsize, its initial value is, for example, zero, which is a value similar to that of the write pointer WP. The write pointer WP is an address of data written into the FIFO memory 102, which is updated after data is written into the FIFO memory 102. On the other hand, the counter value wsize is an address of data to be written into the FIFO memory 102, which is updated before data is written into the FIFO memory 102.

In a period T11, the available capacity monitoring unit 111 computes an available capacity of the FIFO memory 102 based on the read pointer RP input by an asynchronous transfer from the read controller 104, the counter value wsize, and a size FSIZE of the FIFO memory 102 read from an external certain register.

Figure 5A:
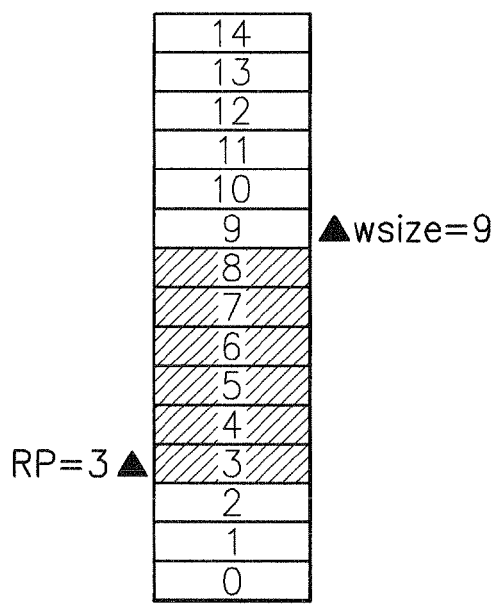
FIG. 5A and FIG. 5B are views to explain a computation method of an available capacity of a FIFO memory.
Figure 5B:
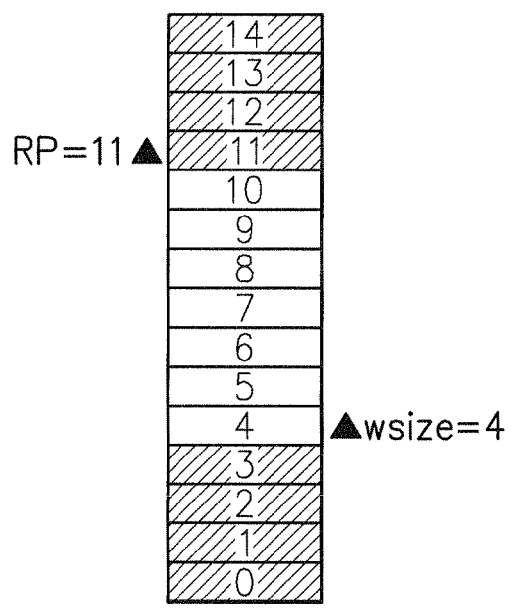

FIG. 5A and FIG. 5B are views to explain a computation method of an available capacity of the FIFO memory 102. For example, the FIFO memory 102 is a memory in which data is first read therefrom in the order that data is first written thereinto, and has 15 stages composed of address pointers 0 to 14. The FIFO memory 102 is a ring buffer in which processing returns to the initial address pointer 0 when processing exceeds the final address pointer 14. In FIG. 5A and FIG. 5B, data are stored in the address pointers where hatches are drawn, and data are not stored in the address pointers where hatches are not drawn. The counter value wsize of a size of data to be written indicates a write address pointer of the following data to be written. When the read request signal REQ is not input from the image processor 100, the counter value wsize is the value same as that of the write pointer WP. The read pointer RP indicates a read address pointer. An available capacity is obtained by the counter value wsize, the read pointer RP, and phase bits associated with the counter value wsize and the read pointer RP respectively. The counter value wsize and the read pointer RP are four bits respectively. For example, the counter value wsize being four bits results in three by 5+6+7 when the data size is added to the initial value being 0 in the order of 5, 6, and 7.

FIG. 5A illustrates the FIFO memory 102 when the phase bits of the counter value wsize and the read pointer RP are the same. As for the phase bits, their initial values are zero, and hereinafter every time the counter value wsize and the read pointer RP turn to zero respectively, toggling in which zero and one are inverted is repeated. The size FSIZE of the FIFO memory 102 is, for example, 15. The counter value wsize is, for example, nine. The read pointer RP is, for example, three. In the address pointers 3 to 8, data are already stored or are to be stored. At this time, an available capacity EMP is expressed by the following expression.

$$EMP = SIZE - wsize + RP$$
$$= F15 - 9 + 3$$
$$= 9$$

That is, nine words in total, which are the address pointers 0 to 2 and 9 to 14, are an available capacity.

FIG. 5B illustrates the FIFO memory 102 when the phase bits of the counter value wsize and the read pointer RP differ. The size FSIZE of the FIFO memory 102 is, for example, 15. The counter value wsize is, for example, four. The read pointer RP is, for example, 11. In the address pointers 11 to 14 and 0 to 3, data are already stored or are to be stored. At this time, the available capacity EMP is expressed by the following expression.

$$EMP = RP - wsize$$
$$= 11 - 4$$
$$= 7$$

That is, seven words in total, which are the address pointers 4 to 10, are an available capacity.

In the period T11 in FIG. 4, for example, the counter value wsize and the read pointer RP are zero, and the phase bits of the counter value wsize and the read pointer RP are the same, so that the available capacity EMP is 15. The available capacity monitoring unit 111 determines whether or not the available capacity EMP (that is 15, for example) is in a state to have a region where data of the data size cnt (that is five, for example) of the read request signal REQ may be written. If the data size cnt is equal to or less than the available capacity EMP, the available capacity EMP is determined in a state to have a writable region. When the available capacity EMP is in a state to have the writable region, the available capacity monitoring unit 111, in a cycle of the following clock signal CLKB in the period T11, outputs a read request signal req to the memory controller 108 and adds the data size cnt (that is five, for example) to the counter value wsize (that is zero, for example). When the available capacity EMP is not writable, the available capacity monitoring unit 111 waits until the available capacity EMP turns to a writable state by updating the read pointer RP.

The memory controller 108 receives the read request signal req from the available capacity monitoring unit 111, and outputs an acknowledge signal ack to the available capacity monitoring unit 111 when the requested data may be read from the external main memory 109. The read request signal req includes information of a start address and a data size of the data requested to be read. Thereafter, the memory controller 108 outputs a data valid signal stb at a high level to the write controller 105 and reads the data requested to be read from the external main memory 109 in a unit of word sequentially to output the data to the FIFO memory 102.

In a period T14, when the data valid signal stb turns to a high level, the write controller 105 writes the data read by the memory controller 108 into the FIFO memory 102 in a unit of word and increments the write pointer WP. In the FIFO memory 102, five pieces of word data are written into the address pointers 0 to 4, and the write pointer WP is incremented to five. The data valid signal stb turns to a high level during a period of the size of data to be read (that is five, for example).

The image processor 100 may output the read request signal REQ continuously. For example, the image processor 100 outputs the read request signal REQ of data whose data size is seven to the request accepting unit 103 subsequently to the read request signal REQ of the above-described data whose data size is five. Then, similarly to the above, the request accepting unit 103 outputs the write enable signal WEN in synchronization with the clock signal CLKA to the register group 106 in the read controller 104 and writes the data size CNT into a certain register in the register group 106. Similarly, the request accepting unit 103 outputs the write enable signal wen in synchronization with the clock signal CLKB to the register group 107 in the write controller 105 and writes the data size CNT into a certain register in the register group 107. Thereafter, the request accepting unit 103 outputs the acknowledge signal ACK to the image processor 100. The register groups 106 and 107 have a plurality of registers equivalent to the number of the continuous read request signals REQ from the image processor 100, (which is three, for example), and store the data size CNT in the different registers by each of the read request signals REQ.

A period T12 is a period after the period T11 and before the period T14, and is a period in the middle of transferring the data whose data size is five. In the period T12, the available capacity monitoring unit 111 outputs the read enable signal ren to the register group 107 to read the data size CNT in the certain register in the register group 107 as the data size cnt. The data size cnt at this time is, for example, seven words.

In a period T13, the available capacity monitoring unit 111 computes the available capacity EMP of the FIFO memory 102 based on the read pointer RP input by an asynchronous transfer from the read controller 104, the counter value wsize, and the size FSIZE of the FIFO memory 102. The available capacity monitoring unit 111 determines whether or not the available capacity EMP is in a state to have a region where the data of the data size cnt (that is seven, for example) of the read request signal REQ may be written. When the available capacity EMP is in a state to have the writable region, the available capacity monitoring unit 111, in a cycle of the following clock signal CLKB in the period T13, outputs the read request signal req to the memory controller 108 and adds the data size cnt (that is seven, for example) to the counter value wsize (that is five, for example). When the available capacity EMP is not writable, the available capacity monitoring unit 111 waits until the available capacity EMP turns to a writable state by updating the read pointer RP.

The memory controller 108 receives the read request signal req from the available capacity monitoring unit 111, and outputs the acknowledge signal ack to the available capacity monitoring unit 111 when the requested data may be read from the external main memory 109. Thereafter, the memory controller 108 outputs the data valid signal stb at a high level to the write controller 105, and sequentially reads the data requested to be read from the external main memory 109 in a unit of word to output the data to the FIFO memory 102.

In a period T15, when the data valid signal stb turns to a high level, the write controller 105 writes the data read by the memory controller 108 into the FIFO memory 102 in a unit of word and increments the write pointer WP. In the FIFO memory 102, seven pieces of word data are written into the address pointers 5 to 11, and the write pointer WP is incremented to 12. The data valid signal stb turns to a high level during a period of the size of data to be read, (which is seven, for example).

As described above, the available capacity monitoring unit 111, by computing the available capacity EMP based on the counter value wsize, may output the read request signal req of the data whose data size cnt is five and the read request signal req of the data whose data size cnt is seven continuously, and the period T15 when the data whose data size cnt is seven is written may be provided early subsequently to the period T14 when the data whose data size cnt is five is written.

As illustrated in FIG. 1, when the available capacity monitoring unit 111 computes the available capacity EMP based on the write pointer WP, as illustrated in FIG. 2, the available capacity monitoring unit 111 waits until the period T1 when the data whose data size is five is written ends, after a value of the write pointer WP is determined, the available capacity monitoring unit 111 next computes the available capacity EMP for the data whose data size is seven, and therefore a period T3 when the data whose data size is seven is written is delayed.

The write pointer WP is updated after data is written into the FIFO memory 102. On the other hand, the counter value wsize is updated as the write pointer of data to be written before data is written into the FIFO memory 102 and at a stage when the data size CNT is written into the register group 107. When the read request signal REQ is not input from the image processor 100, the counter value wsize and the write pointer WP are the same value.

In this embodiment, since the available capacity monitoring unit 111 computes the available capacity EMP based on the counter value wsize, the read request signal req of the following data whose data size is seven may be output even in the period T14 when the data whose data size is five is written, and thus the start of the period T15 when the following data is written may be made early. Accordingly, it may make it possible to improve data transfer efficiency from the external main memory 109 to the FIFO memory 102.

The read controller 104 reads the data written into the FIFO memory 102 to output it to the image processor 100, and outputs a read valid signal STB at a high level to the image processor 100. On this occasion, a control such that the read data of the read pointer RP in the FIFO memory 102 does not overtake the written data of the write pointer WP becomes a necessity. A relationship between the read pointer RP and the write pointer WP is similar to a relationship between the read pointer RP and the counter value wsize in FIGS. 5A and 5B. Thus, the read controller 104 controls to read data from the FIFO memory 102 while monitoring a magnitude relationship between the read pointer RP and the write pointer WP input from the write controller 105 by performing an asynchronous transfer. That is, the read controller 104 waits to read data of the read pointer RP until the write pointer WP is updated when the read pointer RP overtakes the write pointer WP.

Figure 6:
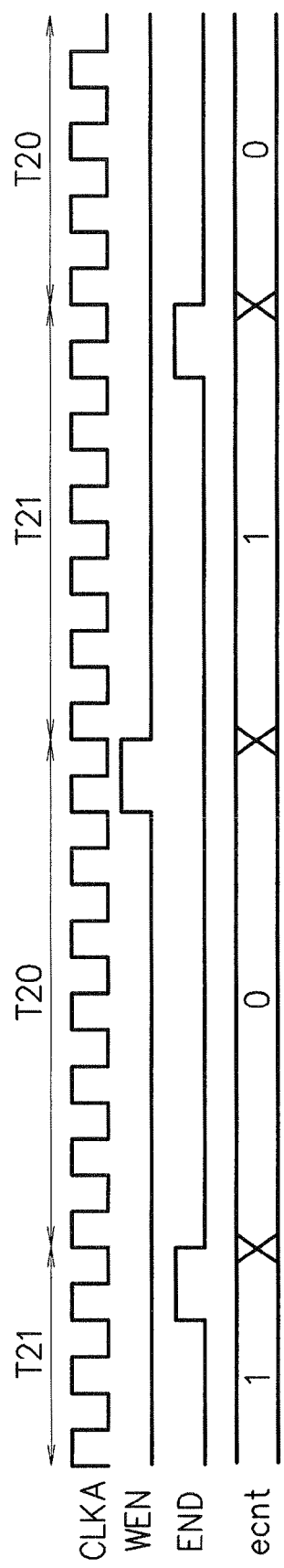
FIG. 6 is a timing chart illustrating a processing method of a read controller.

FIG. 6 is a timing chart illustrating a processing method of the read controller 104. The read controller 104 has an up/down counter and may always monitor a state where the data size CNT is written into the register group 106. The above up/down counter counts up a counter value ecnt by pulses of the write enable signal WEN to the register group 106 and counts down the counter value ecnt by pulses of an end signal END meaning the end of the read valid signal STB to the image processor 100. The end signal END has high level pulses generated when the data valid signal stb falls to a low level.

A period T20 is a period when the counter value ecnt is zero, and a period T21 is a period when the counter value ecnt is equal to or more than one. In the period T21, the counter value ecnt of the up/down counter is equal to or more than one, and the register group 106 is in a state to hold the data size CNT. In the period T21, the read controller 104 makes an inquiry regarding the write pointer WP to the write controller 105 to check whether the read pointer RP does not overtake the write pointer WP.

On the other hand, in the period T20, since the counter value ecnt of the up/down counter is zero, the register group 106 is in a state not to hold anything, namely is in a state where the read request signal REQ is not input from the image processor 100 to the data transfer device 101. In the above period T20, the read controller 104 does not make an inquiry regarding the write pointer WP to the write controller 105. The period 121 is a period when an inquiry regarding the write pointer WP is generated, and the period T20 is a period when an inquiry regarding the write pointer WP is stopped. Thus, an inquiry regarding the write pointer WP is generated in the period 121, so that power consumption of the data transfer device 101 is reduced.

When pulses of the end signal END are generated, the read controller 104 resets and releases the corresponding register in the register group 106 and the write controller 105 resets and releases the corresponding register in the register group 107.

As described above, in the period 121 when writing of the data size CNT is generated in the register groups 106, the read controller 104 performs data transfer to the image processor 100 while making an inquiry regarding the write pointer WP to the write controller 105.

Second Embodiment

FIG. 7 is a block diagram illustrating a constitution example of a memory access system according to a second embodiment. The memory access system in the first embodiment (FIG. 3) is constituted in a manner that the memory controller 108 for the external main memory 109 and the data transfer device 101 are independent respectively. On the other hand, in the memory access system in this embodiment (FIG. 7), a data transfer device 101 has a function of a memory controller 108 to perform a control of an external main memory 109 and a FIFO memory 102. As for points except the above, the memory access system in this embodiment (FIG. 7) is similar to the memory access system in the first embodiment (FIG. 3).

As described above, according to the first and second embodiments, the available capacity monitoring unit 111, by computing the available capacity EMP of the FIFO memory 102 based on the read pointer RP, the counter value wsize of a data size, and the size FSIZE of the FIFO memory 102, may output the following read request signal req to the memory controller 108 without waiting for the completion of the period T14 when data in response to the read request signal req is written. The counter value wsize of a data size is used at the time when the available capacity EMP of the FIFO memory 102 is computed, thereby making data transfer efficiency improved without depending on an update of the write pointer WP in the write controller 105. Further, the read controller 104, in the period T21 when writing of the data size CNT into the register group 106 is generated, makes an inquiry regarding the write pointer WP to the write controller 105 to control to read data from the FIFO memory 102. An inquiry regarding the write pointer WP is made in the period T21 in need, so that power consumption may be reduced.

The image processor 100 requests data corresponding to a processing region. The external main memory 109 stores data therein. The available capacity monitoring unit 111 has a counter to count the counter value wsize based on a value holding the size CNT of the data corresponding to the processing region requested from the image processor 100. The FIFO memory 102 is coupled between the image processor 100 and the external main memory 109 where the above-described data corresponding to the processing region is stored. The available capacity monitoring unit 111 is a detector to detect a state of the FIFO memory 102 based on the read pointer RP and the counter value wsize in the FIFO memory 102. The write controller 105 outputs a transfer request signal req to transfer the above-described data corresponding to the processing region from the external main memory 109 to the FIFO memory 102 based on a detection result of the available capacity monitoring unit 111.

The write controller 105 may output the transfer request signal req before the on-going writing from the external main memory 109 into the FIFO memory 102 is completed when the available capacity monitoring unit 111 detects that the FIFO memory 102 is in a state to have a writable region.

The clock signal CLKA of the read controller 104 and the clock signal CLKB of the write controller 105 differ in frequency. That is, a transfer speed from the FIFO memory 102 to the image processor 100 and a transfer speed from the external main memory 109 to the FIFO memory 102 differ.

The available capacity monitoring unit 111 computes the available capacity EMP of the FIFO memory 102 based on the read pointer RP and the counter value wsize in the FIFO memory 102 to determine whether the available capacity EMP has a writable region.

The counter value wsize is counted when the available capacity EMP has the writable region.

The register groups 106 and 107 have registers to hold the size CNT of data corresponding to a processing region requested from the image processor 100. The write controller 105 controls writing into the FIFO memory 102 in accordance with the write pointer WP. The read controller 104 controls reading from the FIFO memory 102 in accordance with the read pointer RP. The write controller 105 controls the write pointer WP of the FIFO memory 102. The read controller 104 inquires the write pointer WP to the write controller 105 to control reading from the FIFO memory 102 in accordance with the write pointer WP during a period when the data size CNT is held in the register in the register group 106 and then data corresponding to the data size CNT is transferred from the external main memory 109 to the FIFO memory 102 by the data valid signal stb at a high level.

According to the first and second embodiments, using the counter value wsize of a size of requested data enables transfer to be controlled without depending on an update of the write pointer WP of the FIFO memory 102, so that data transfer efficiency may be improved.

Note that the above embodiments merely illustrate concrete examples of implementing the present embodiments, and the technical scope of the present embodiments is not to be construed in a restrictive manner by these embodiments. That is, the present embodiments may be implemented in various forms without departing from the technical spirit or main features thereof.

Using a counter value of a size of requested data enables transfer to be controlled without depending on an update of the write pointer of the second memory, so that data transfer efficiency may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A memory access device configured to perform data transfer between a processor and a first memory, the memory access device comprising:
   a second memory coupled between the processor and the first memory;
   a memory controller configured to transfer a data from the first memory to the second memory based on a transfer request;
   a read controller configured to read the data from the second memory, output the data to the processor, and control a read pointer indicating an address reading the data from the second memory;
   and
   a write controller configured to output the transfer request to the memory controller,
   wherein the write controller computes an available capacity of the second memory based on the read pointer, a size of the second memory and a cumulative addition value obtained by adding cumulatively a data size which is requested from the processor, wherein the cumulative addition value is an address of data to be written into the second memory, and outputs the transfer request based on the available capacity.

2. The memory access device according to claim 1, wherein the write controller outputs the transfer request when the write controller detects that the second memory is in a state to have a writable region.

3. The memory access device according to claim 2, wherein the first memory is a main memory and the second memory is a FIFO memory.

4. The memory access device according to claim 3, wherein the write controller, based on a read pointer in the FIFO memory, the cumulative addition value and the FIFO memory size, computes an available capacity of the FIFO memory and determines whether the available capacity is the writable region.

5. The memory access device according to claim 1, wherein
   a transfer speed from the second memory to the processor and a transfer speed from the first memory to the second memory differ.

6. The memory access device according to claim 1, comprising:
   a register holding a number indicating the data size corresponding to the request from the processor, and wherein
   the write controller controls writing into the second memory in accordance with a write pointer and controls the write pointer of the second memory, and
   the read controller, during a period until data corresponding to the data size is transferred from the first memory to the second memory after the data size is written into the register, inputs the write pointer to the write controller to control reading from the second memory in accordance with the write pointer.

7. A memory access system, comprising:
a processor;
a first memory storing a data; and
a memory access device configured to perform data transfer between the processor and the first memory, wherein the memory access device comprises:

a second memory coupled between the processor and the first memory;

a memory controller configured to transfer the data from the first memory to the second memory based on a transfer request;

a read controller configured to read the data from the second memory, output the data to the processor, and control a read pointer indicating an address reading the data from the second memory;

and a write controller configured to output the transfer request to the memory controller, wherein the write controller computes an available capacity of the second memory based on the read pointer, a size of the second memory and a cumulative addition value obtained by adding cumulatively a data size which is requested from the processor, wherein the cumulative addition value is an address of data to be written into the second memory, and outputs the transfer request based on the available capacity.

8. The memory access system according to claim 7, wherein the write controller outputs the transfer request when the write controller detects that the second memory is in a state to have a writable region.

9. The memory access system according to claim 7, wherein a transfer speed from the second memory to the processor and a transfer speed from the first memory to the second memory differ.

10. The memory access system according to claim 7, wherein the first memory is a main memory and the second memory is a FIFO memory.

11. The memory access system according to claim 10, wherein the write controller, based on a read pointer in the FIFO memory, the cumulative addition value and the FIFO memory size, computes an available capacity of the FIFO memory and determines whether the available capacity is a writable region.

12. The memory access system according to claim 7, comprising:

a register holding a number indicating the data size corresponding to the request from the processor, and wherein the write controller controlling writing into the second memory in accordance with a write pointer controls the write pointer of the second memory, and the read controller, during a period until data corresponding to the data size is transferred from the first memory to the second memory after the data size is written into the register, inputs the write pointer to the write controller to control reading from the second memory in accordance with the write pointer.

13. A processing method of a memory access device configured to perform data transfer between a processor and a first memory, the processing method comprising:

reading a data from a second memory which is coupled between the processor and the first memory outputting the data to the processor;

controlling a read pointer indicating an address reading the data from the second memory;

computing an available capacity of the second memory based on the read pointer, a size of the second memory and a cumulative addition value obtained by adding cumulatively a data size which is requested from the processor, wherein the cumulative addition value is an address of data to be written into the second memory;

outputting a transfer request based on the available capacity; and transferring the data from the first memory to the second memory based on the transfer request.

* * * * *